(12) United States Patent
Lippincott et al.

(10) Patent No.: US 7,827,386 B2
(45) Date of Patent: Nov. 2, 2010

(54) CONTROLLING MEMORY ACCESS DEVICES IN A DATA DRIVEN ARCHITECTURE MESH ARRAY

(75) Inventors: Louis A. Lippincott, Chandler, AZ (US); Chin Hong Cheah, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 1465 days.

(21) Appl. No.: 10/611,377

(22) Filed: Jun. 30, 2003

(65) Prior Publication Data

US 2004/0268088 A1    Dec. 30, 2004

(51) Int. Cl.
G06F 15/00    (2006.01)
G06F 15/76    (2006.01)

(52) U.S. Cl. ...................................... 712/25
(58) Field of Classification Search ............ 712/25
See application file for complete search history.

(56) References Cited

U.S. PATENT DOCUMENTS

| | | | |
|---|---|---|---|
| 5,388,230 A | | 2/1995 | Yamada et al. |
| 5,410,723 A | * | 4/1995 | Schmidt et al. ............... 712/18 |
| 5,613,146 A | * | 3/1997 | Gove et al. .................... 712/20 |
| 5,729,711 A | * | 3/1998 | Okamoto .................... 711/205 |
| 6,073,185 A | * | 6/2000 | Meeker ........................ 710/1 |
| 6,173,388 B1 | * | 1/2001 | Abercrombie et al. ........ 712/22 |
| 6,260,082 B1 | | 7/2001 | Barry et al. |
| 2002/0147768 A1 | | 10/2002 | Vavro |
| 2003/0144828 A1 | * | 7/2003 | Lin .............................. 703/21 |
| 2004/0257372 A1 | | 12/2004 | Lippincott |
| 2005/0018929 A1 | | 1/2005 | Lippincott |

OTHER PUBLICATIONS

PCT International Search Report, dated Jun. 30, 2005 (International Application No. PCT/US2004/019613—International Filing Date Jun. 18, 2004) (12 pages).

Taylor, et al., "Dynamic Hardware Plugins (DPH): Exploiting Reconfigurable Hardware for High-Perfomance Programmable Routers", Open Architectures and Network Programming Proceedings, 2001 IEEE Apr. 27-28, 2001, Piscataway, NJ, USA, XP010538879, ISBN: 0-7803-7064-3 (pp. 25-34).

(Continued)

*Primary Examiner*—Eddie P Chan
*Assistant Examiner*—Corey Faherty
(74) *Attorney, Agent, or Firm*—Blakely, Sokoloff, Taylor & Zafman LLP

(57) ABSTRACT

A first set of instructions and incoming data are provided to a first processing unit of a data driven processor, to operate upon the incoming data. The first processing unit, in response to recognizing that the first set of instructions will require either reading from or writing to external memory, sets up a logical channel between a second processing unit of the processor and the external memory, to transfer additional data between the external memory and the second processing unit. This capability may be implemented by the addition of a control port, separate from data ports, to the first processing unit, where the control port allows the first processing unit to write addressing information and mode information (including the location of the additional data) for reading or writing the additional data via a memory access unit data channel of the processor.

20 Claims, 11 Drawing Sheets

OTHER PUBLICATIONS

Borkar, et al., "Supporting Systolic and Memory Communication in iWarp", Proceedings of the Annual International Symposium on Computer Architecture, Seattle, USA, May 28-31, 1990, Los Alamitos, IEEE Comp. Soc. Press, US, vol. Symp. 17, May 28, 1990, XP010019266, ISBN: 0-8186-2047-1 (pp. 70-81).

"Sharp Develops the World's First Non-Von Neuman Data-Driven Parallel-Processing Media Processor", Sharp Corporation, Mar. 31, 1997 ( pp. 1-6).

"MPEG-4 Toolkit Improves on Motion Vector Calculation", Paul Fernandez, et al., Linear Technology LT® 3430 60 Volts, Plus . . . , Planet Analog (pp. 1-8), Jan. 8, 2003.

* cited by examiner

Provide A First Set Of Instructions And Incoming Data To A First Processing Unit Of A Data Driven Processor. 804

The First Processing Unit Sets Up A Logical Channel Between A Second Processing Unit Of The Processor And External Memory, To Transfer Additional Data Between The External Memory And The Second Processing Unit. 808

A Second Set Of Instructions Is Provided To The Second Processing Unit To Either Operate Upon Or Generate This Additional Data. 812

CONTROLLING MEMORY ACCESS DEVICES IN A DATA DRIVEN ARCHITECTURE MESH ARRAY

BACKGROUND

The embodiments of the invention described below are related to a practical implementation of a data driven processor, i.e. one that gives good performance over a wider range of applications but at a relatively low cost.

The data driven architecture for a processor was developed to provide a better solution than the von Neumann architecture, to address the particular problem of processing a large amount of data using relatively few instructions. The von Neumann type processor is controlled by a clocked addressing scheme that can pull instructions and data from almost anywhere in memory. With little restriction on the type of instructions or the locations in memory that can be accessed, the von Neumann processor has the flexibility to run a wide range of different programs. In contrast, a data driven processor ("DDP") is designed to be fed blocks of data that are typically consecutively stored in memory (or arrive as a stream) and are to be processed according to a program that has only a small number of instructions that operate on the data. These types of programs can be found in applications such as digital encoding and filtering of documents (used in reprographics copiers, for example) and of audio and video data. Examples of audio and video data applications include compression and decompression in portable, consumer information products such as digital cameras, mobile general purpose computers, and small media devices such as MP3 players. The DDP may be particularly suited for such battery-powered products due to its inherent power efficiency, as its power consumption quickly drops to essentially zero when there is no more input data for it to consume.

In most consumer products that have a DDP, a built-in host controller ("HC") assists the DDP by orchestrating the feeding of instructions and incoming data to the individual processing elements of the DDP. For example, a primary, general purpose processor or embedded processor of a consumer product can be programmed to act as the HC. The HC instructs each of the processing elements of a DDP as to the task to be performed. The HC also controls the formation of data paths between the DDP and external memory, to receive the outgoing data, i.e., the results of consumption by the processing elements. The DDP can be equipped with a direct memory access ("DMA") unit that delivers a stream of outgoing data, that originates from the individual processing elements of the DDP, to sequentially addressed memory locations that have been identified by the HC. A processing element of a typical DDP is not aware of the source of the incoming data; nor does it know where its result data is ultimately destined. That information is only known to the HC.

BRIEF DESCRIPTION OF THE DRAWINGS

The embodiments of the invention are illustrated by way of example and not by way of limitation in the figures of the accompanying drawings in which like references indicate similar elements. It should be noted that references to "an" embodiment of the invention in this disclosure are not necessarily to the same embodiment, and they mean at least one.

FIG. 8 depicts a flow diagram of a method for processing data according to an embodiment of the invention.

DETAILED DESCRIPTION

Figure 1:
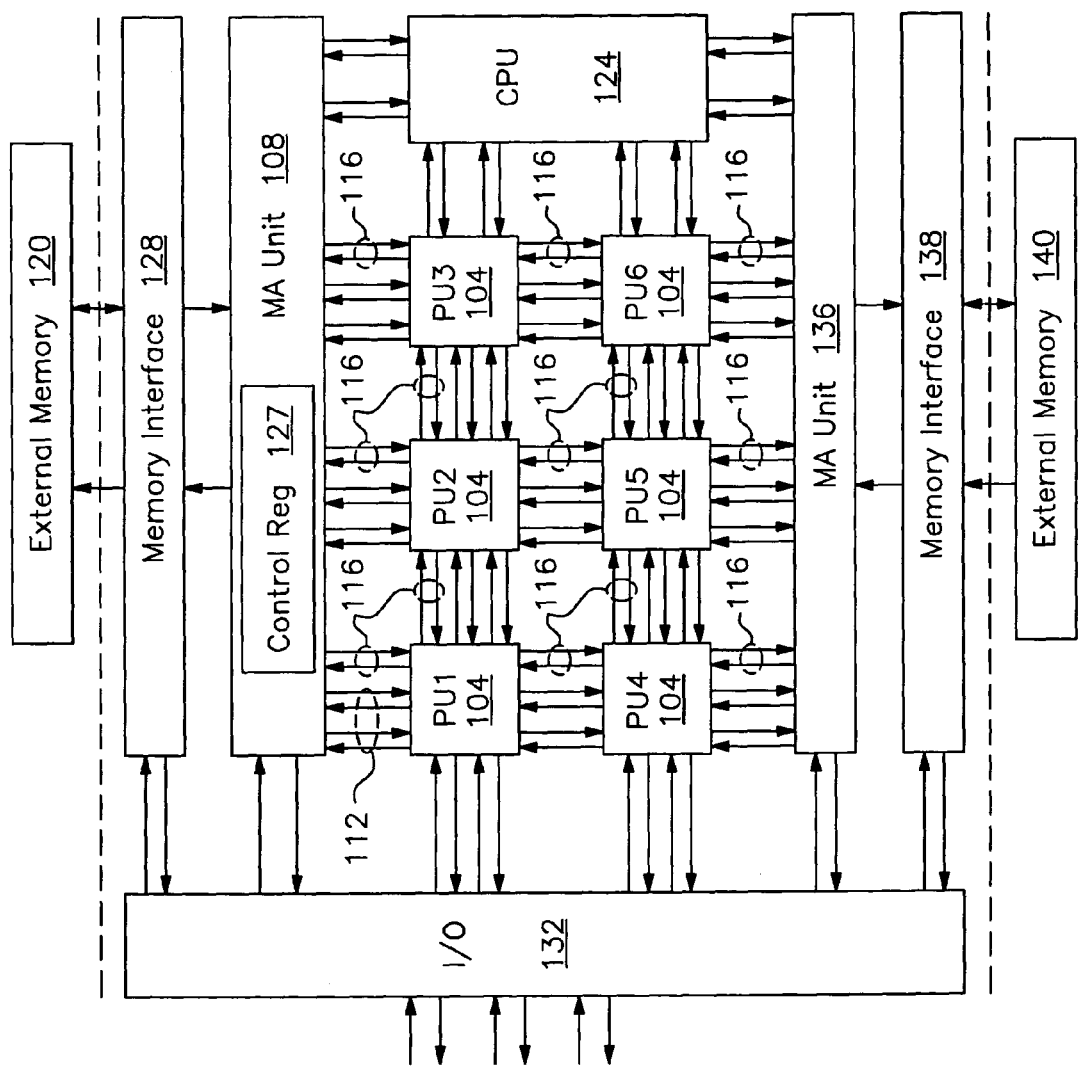
FIG. 1 shows a block diagram of a processor having a data driven architecture.

Beginning with FIG. 1, this figure shows a block diagram of a processor having a data driven architecture that is expected to provide good performance over a wider range of applications but at a relatively low cost. The processor is composed of a number of processing units (PUs) 104 (in this case, there are 6). Each PU 104 has a number of data ports (in this example, 16) that are coupled to each other as shown in a mesh arrangement. The data ports are programmable to allow data flow from any one of the processing units to another, and from any one of the processing units to a memory access unit 108.

According to an embodiment of the invention, one or more of the PUs 104 are provided with a control port from which the PU can send information to the memory access unit 108 about the location of data to be read from or written to in external memory 120. The data and control ports are not explicitly labeled in FIG. 1, but are implied by virtue of the data lines 112 and the control lines 116, respectively. Addressing information and mode information, regarding a memory access channel, that is sent through a control port is destined to a memory access control register 127. The control register 127, for example, determines the settings for a DMA channel regarding the mode of operation of the DMA channel as well as location identifiers for the data that is to be transferred through the channel.

A PU 104 is normally not aware of the particular location in external memory 120 from which data is read, or to which data is written. The PU 104 merely consumes data that comes in through its input port, based on instructions which have been programmed for it, and provides result data through its designated output port. The output port is part of the data path that has been created to deliver the result data to a particular location in external memory 120. A host controller (not shown) may be used to normally instruct or program a PU to read from and write data to one or more of its data ports which is logically connected, via a programmed data path, to the memory access unit 108. In the embodiment of FIG. 1, however, one or more of the PUs 104 is also capable of sending a read or write request to the memory access unit 108, thereby freeing the host controller from such tasks. This memory addressing capability in one or more PUs 104 allows the processor as a whole to be better suited to process certain applications where the next block of incoming data to be processed is not consecutively stored in memory. Following a more detailed description of the processor, an example video decoding application will be described to illustrate some benefits of the added memory addressing capability of a PU 104.

The memory access unit 108 of the processor may be a direct memory access (DMA) unit that can read and write the external memory 120 without intervention by a central processing unit (CPU) 124. The memory access unit 108 serves to translate higher level read and write commands, received from a control port of one or more of the PUs 104, the CPU 124, or an external host controller (not shown), into lower level memory access commands. The higher level read and write commands may be application specific, for example, specific to a video, document, or audio application. As an example, the PU 104 may generate a read request to the memory access unit 108 for accessing a given frame of image data, but that certain pixels are to be skipped. As another example, the read request may be for just a particular block of an entire image frame. Such high level requests may simply refer to pixel locations given by the Cartesian coordinates on a display, for example. In response, the memory access commands that are generated by the memory access unit 108 would refer to specific addresses in the external memory 120 at which the pixel values are stored. In some cases, memory interface circuitry 128 as shown in FIG. 1 would also be needed, to insure that these lower level memory accesses meet the signal level and timing requirements of the external memory 120. A number of DMA channels are available to request read and write transactions, and to transfer data from and to the external memory.

The processor shown in FIG. 1 also has an I/O interface 132 to external devices (not shown). It can be seen that some of the output and input data ports of the PUs 104, and in particular those of the outlying PU1 and PU4, are coupled to the I/O interface 132. The interface 132 allows incoming data and result data to be transferred between the PUs 104 and external devices such as hard disk drives, CD-ROM drives, and video displays. The interface 132 may thus be designed to translate between the signaling needed by the data ports of the PUs 104 and the signaling of a parallel computer peripheral bus or a high speed serial bus. The interface 132 may be used for incoming and result streams of audio or video data. As an alternative, all of the incoming and result data, for example, entire image frames, may be stored in the external memory 120 and only after all processing has been completed will the result data be transferred to a mass storage device or other peripheral.

To further improve the performance of the processor with respect to external memory, an additional memory access unit 136 may be provided that, via a separate memory interface 138, will allow the PUs 104 to also use the storage available in an additional external memory 140. In such an embodiment, the data ports on a north side of PU1-PU3 are coupled to the first memory access unit 108, while the data ports on a south side of PU4-PU6 are coupled to the second memory access unit 136. To allow PU1-PU3 access to the external memory 140 (on the south side), the south side data ports of PU1-PU3 are coupled to the north side data ports of PU4-PU6.

Figure 2:
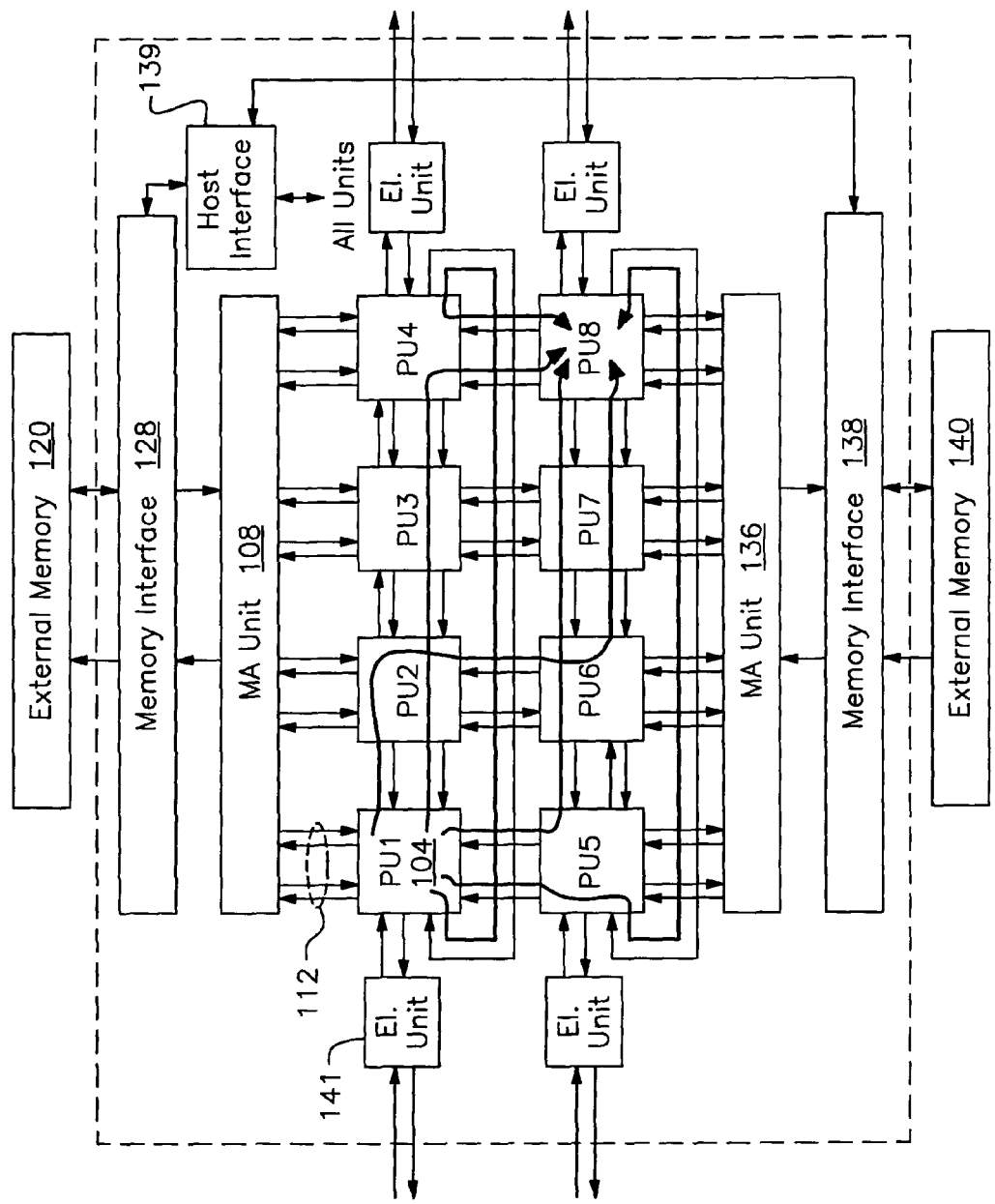
FIG. 2 illustrates example data paths that can be created in another embodiment of the processor.

The embodiment of the processor shown in FIG. 1 also has a CPU 124. The CPU 124, which may be provided on chip with the PUs 104, is to read and execute instructions that configure the data ports of the PUs 104 and the memory access units 108, 136, to create data channels from any one of the PUs 104 to the external memory 120, 140. This functionality of creating data paths through the mesh arrangement of data ports, and instructing the PUs 104 with their individual tasks, may instead be delegated to an external host controller (not shown). FIG. 2 will be used to illustrate the flexibility of the data ports in creating multiple data paths between PUs.

FIG. 2 illustrates example data paths that can be created between two points in another embodiment of the processor. In this embodiment, there are eight PUs 104 and five data paths are shown that link PU1 with PU8. Each PU 104 has data ports that connect with four sets of data lines 112 on each side (the control ports and corresponding control lines 116 are not shown, but see FIG. 1). The data port mesh supports data flow from any one of the PUs 104 to another, and through a data channel to the external memory 120, 140. The external memory 120, 140 may be a dedicated, solid state memory of the buffer-type, suitable for relatively high speed access and relatively large storage, used in applications such as document processing, and video and audio processing. Alternatively, the external memory 120, 140 may be part of the main memory of the host controller (not shown) or other main memory in the electronic system. The external memory 120, 140 may be composed of double data rate or synchronous dynamic random access memory; other types of solid state memory that are suitable for the particular application of the processor may alternatively be used.

As mentioned above, the data ports can be configured to establish a logical connection between any two points in the processor. The configuration of the data port mesh in this embodiment is controlled by a host processor (not shown) that is connected by way of a computer peripheral bus (not shown), through host interface 139. A relatively low speed, global bus (not shown) connects the host interface 139 to all of the PUs 104, the memory access units 108, as well as other components of the processor. This global bus is used to configure or program the processor by loading instructions or microcode for the PUs 104, as well as reading status registers (not shown). In addition, each of the outlying PUs, namely PU1, PU5, PU4, and PU8, has a pair of data ports coupled to a respective expansion interface (EI) unit 141. The EI units 141 permit the data port communications mesh to be extended over multiple processors, and allows the connection of external peripheral devices as mentioned above such as video displays, hard disk drives and printers, to the processor.

The PUs 104 may be essentially identical units each having a number of sides, where each side has multiple, unidirectional, data ports of which at least one is an input port and at least one is an output port. In the embodiment of FIG. 2, the type of coupling of each pair of data ports, from adjacent PUs 104, is a point-to-point, unidirectional connection. The design of the data ports and their connections to programming elements of each PU (to be further described below in connection with FIGS. 4-7) is such that the programming elements within each PU need not be involved in any data that is being transferred through the data ports of that PU. Thus, in the example shown in FIG. 2, the only PUs 104 that are actually reading or writing the data ports involved are PU1 and PU8. Note the five different possible data paths that can be configured between those two PUs, showing the flexibility of the data port mesh architecture. For the sake of clarity, not all possible data paths between PU1 and PU8 are shown in FIG. 2; in addition, it should now be clear that similar programmable data paths may be created between any one of the PUs 104 and the external memory 120 or 140, via any desired data channel through memory access unit 108 or 136.

Allowing the control registers 127 of the memory access unit 108 (see FIG. 1) to be written via control ports of one or more PUs 104 is expected to make the processor as a whole better suited for a video processing application, in which the location of incoming data that needs to be processed does not always change progressively or sequentially on a block-by-block basis. As an example, consider video compression in which frame-to-frame temporal redundancies are reduced, in the compression stage, by generating a motion vector, for a current frame, that points to a change in the location of an image block from a previous frame, due to motion in the scene. Now consider the decoding or decompression stage, where PU1 has been instructed to decode incoming video data to reconstruct a "current" frame. This incoming video data may also include a motion vector. Because a motion vector points to a block of image data that is in a previous frame, a separate access to external memory will be needed to fetch that block. In other words, the motion vector points to an image block of a prior frame that is stored in the external memory 120 and that needs to be copied to decode the current frame. Note that the exact display location (x,y) of this block is not known to the host controller in advance of the start of the decoding process. However, once that information becomes available to a processing unit (e.g., PU1) an access to external memory may be expeditiously performed as follows. First, PU1 sends a command through its control port to read from location (x,y) via a certain data channel Z of the memory access unit. This results in configuring the control registers 127 of the memory access unit 108 with addressing and mode information relevant to the motion vector (in this case, read from location (x,y) via data channel Z). The read data is then fetched by the memory access unit 108 and made available through its channel Z. Since a logical data path had been previously programmed between channel Z of the memory access unit and PU5 (e.g., by the external host controller), the image block pointed to by the motion vector will be routed through that path and into PU5. PU5, as previously instructed, then consumes this data, and writes the result data, including in this case a decoded macro block that is generated by PU5 based on the motion vector and according to some previously programmed algorithm, back to the external memory for the current frame.

In general, giving one or more PUs 104 control of what addressing information can be sent to external memory may yield greater programming freedom and flexibility for the processor as a whole. The provision of the control ports in one or more PUs allows more of the logical complexity of an algorithm to be contained in the PUs 104, and accordingly makes the CPU 124 (see FIG. 1) or host controller (not shown) more available to handle the more complex tasks of running the application. The addition of the control ports does not adversely affect the benefits of the data port mesh arrangement, which retains the advantages of a data driven architecture (including reduced timing issues and improved power efficiency), the parallel processing ability of multiple PUs, and the scalability and modularity of the PU design.

Still referring to FIG. 2, the memory interface circuitry 128 may be on-chip with the memory access unit 108 all of the PUs 104, and the host interface 139. As an alternative, the components may be part of a multi-chip package, where for example each PU 104 is on a separate chip.

Figure 3:
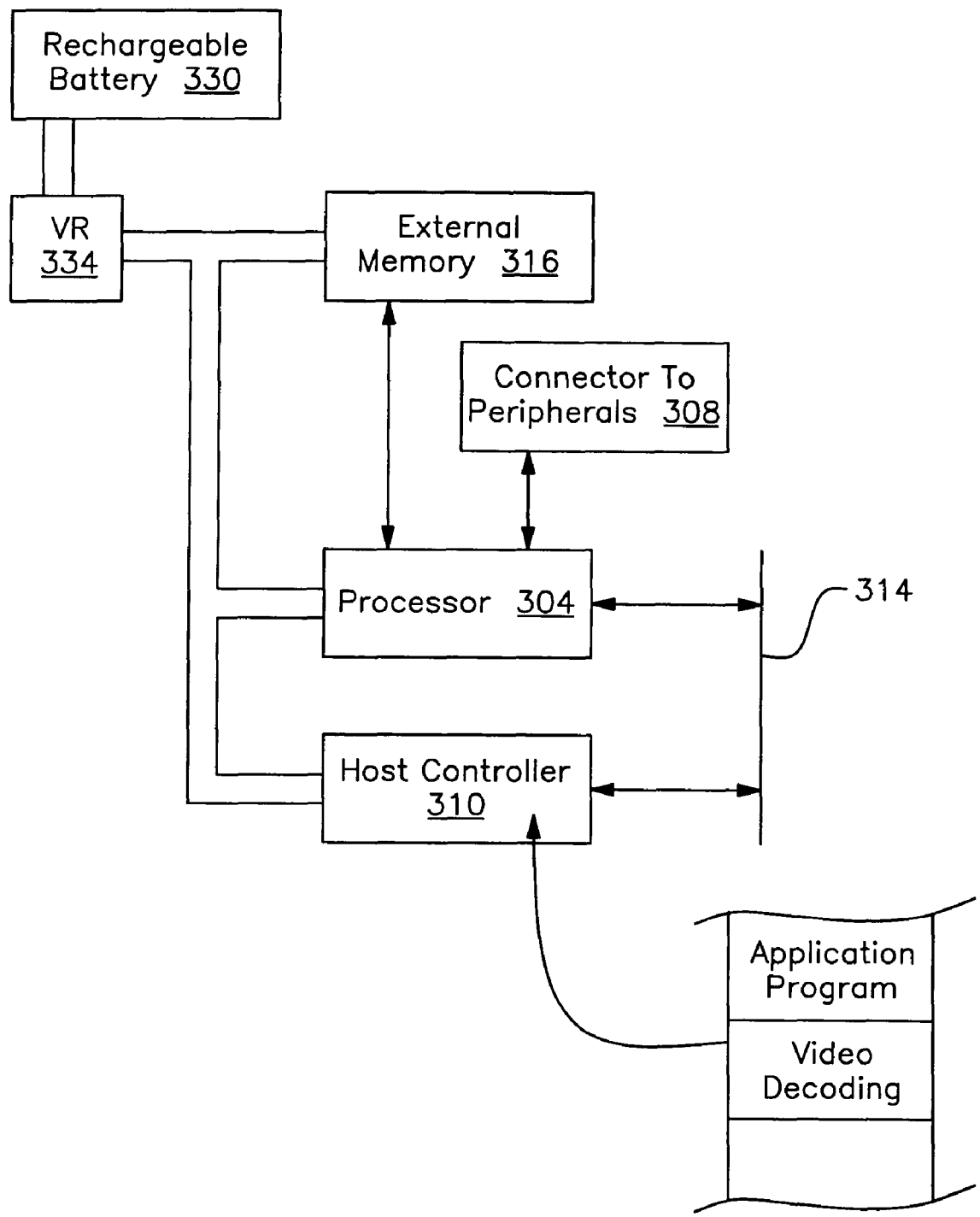
FIG. 3 depicts a block diagram of an electronic system featuring an embodiment of the processor.

Turning now to FIG. 3, a block diagram of an electronic system that contains a data driven processor 304 as described above is shown. The system may be any form of computing or communication device that can manipulate image, audio, or other media in preparation for being either displayed or audibilized (e.g. decompressing a video or audio file), stored (e.g. compressed prior to storage), or printed. The system has a connector 308 that allows the processor 304 to provide its result data directly to the peripherals (not shown) via for example the I/O interface 132 (see FIG. 1). The system also has a host controller 310 that is coupled to communicate with the processor 304 via a bus 314 which may be a serial or parallel computer peripheral bus. The host controller 310 is configured to execute an application program, such as the video decoding example given above, that contains tasks which are particularly suited for execution by a data driven architecture as provided by the processor 304. The host controller 310 may include an embedded processor and its associated main memory (not shown).

The content data to be consumed by the processor 304 may be stored in an external memory 316 (e.g. entire image frames) and can be accessed by the individual processing units of the processor 304 via the data port mesh connection described above. A host interface unit (not shown) in the processor 304 is to receive instructions from the host controller 310 that instruct the individual processing units with their tasks and create data paths from the processing units through a data channel to the external memory 316. The processor 304 is also enhanced with control ports in one or more of its processing units, used for writing data channel addressing information to a memory access unit of the processor 304. The system shown in FIG. 3 also has a fuel cell or rechargeable battery 330 that is coupled to power the external memory 316, the host controller 310, and the processor 304 by way of a voltage regulator (VR) module 334. Of course, if the output voltage of the fuel cell or rechargeable battery 330 is sufficiently stable to meet the requirements of the external memory, processor, and host controller, then the VR module 334 may not be needed.

Figure 4:
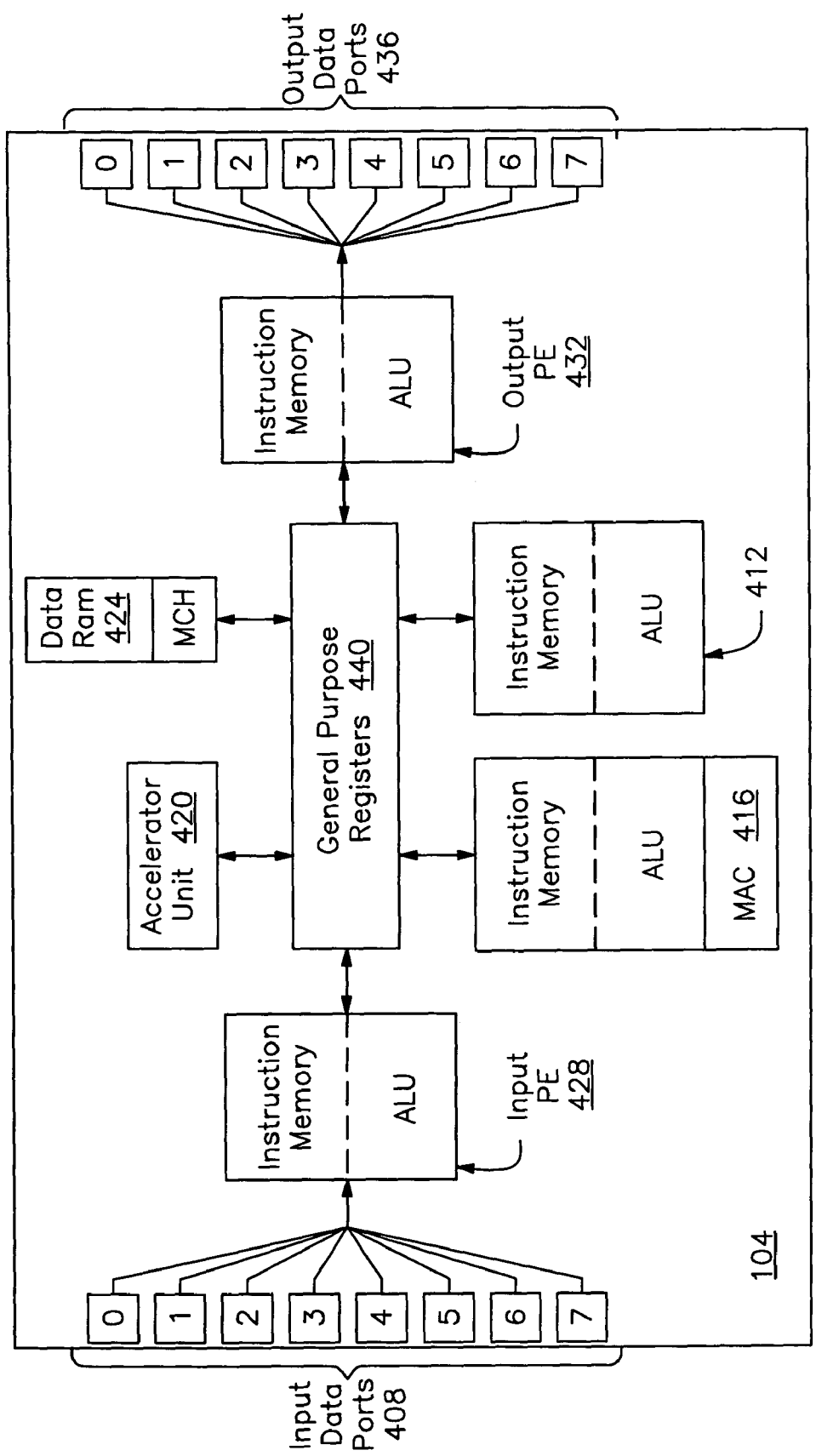
FIG. 4 shows a block diagram of the components of an embodiment of the processor.

Referring now to FIG. 4, a block diagram of the PU 104 is shown. In this embodiment, the PU 104 has one or more core programming elements (PEs) that can be programmed to execute instructions that operate on incoming data received via any one of eight input data ports 408. Each PE has instruction memory as well as an arithmetic and logic unit (ALU) which implement a baseline instruction set architecture. In addition, there can be a multiply and accumulate function (MAC) unit that is added to one or more PEs 416. Additional PEs include one or more accelerator units 420 (e.g. for performing special operations such as two's-complement multiplication and application-specific digital filtering), and a memory command handler (MCH) 424 with integrated data RAM for local storage of data, constants, and instructions within the PU 104 may be provided. An input PE 428 can read data from any one of the input data ports 408 of the PU 104, while an output PE 432 can write the result data to any one of multiple output data ports 436. A set of general purpose registers 440 allow data to be exchanged between the PEs, according to a predefined semaphore protocol. See also U.S. Patent Application publication No. US 2002/0147768 of Vavro for a further example of a data driven digital signal processor having multiple processing elements that are coupled together via a number of general purpose registers. Note that in the embodiment of FIG. 4, each core PE of the PU 104 can execute its instructions independently of a data path that is operating through a pair of the input and output data ports 408, 436 of that PU. In other words, there is a data path between an input data port 408, the input PE 428, the general purpose registers 440, the output PE 432, and the output data port 436, independent of the operations of the PEs 412, 416, accelerator unit 420, and MCH 424. Additional details regarding the input and output data ports 408 and 436 are given below in connection with FIGS. 5-7.

Figure 5:
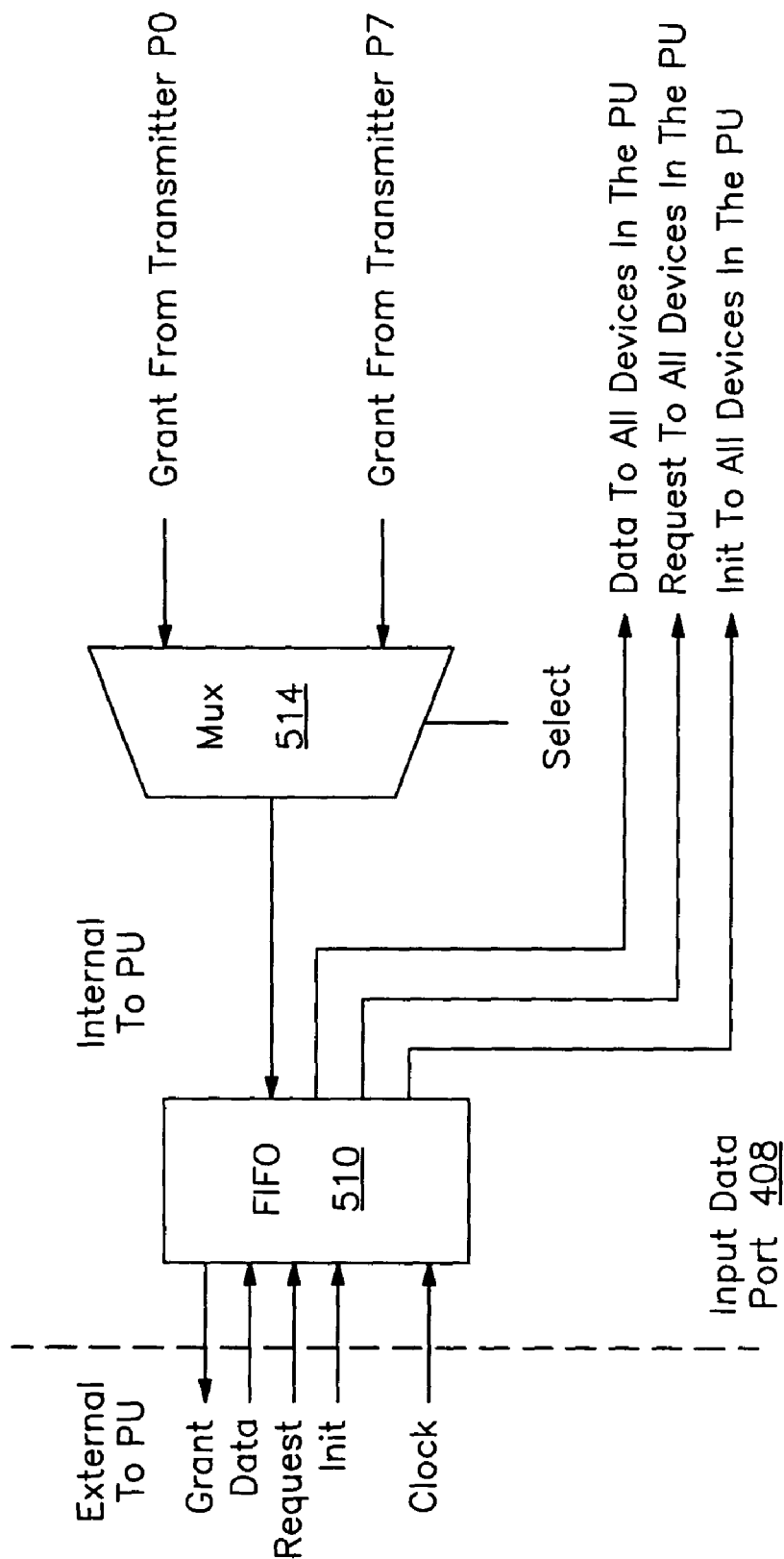
FIG. 5 illustrates a block diagram of part of an input data port used in the processor.

Turning now to FIG. 5, what is shown is a block diagram of part of an input data port 408 (see FIG. 4). The input data port 408 is to receive data from other PUs. The input data port communicates by way of a request/grant protocol where a Request is presented from outside the PU along with Data. The input data port returns Grant when the data is accepted. In this embodiment, the request/grant protocol requires that data has been transferred whenever the request and grant signals are active on the active edge of the input Clock signal. This input data is temporarily stored in a first-in first-out (FIFO) buffer 510. The data is thus stored in the FIFO 510 until a Grant signal from one of a number of so called transmitters P0-P7 is received. A multiplexer 514 is provided to select one of these, in this case, eight, grant signals from the device to which this input data port 408 is connected. The input data port 408 may be programmed by a register setting that controls the select input to the multiplexer 514, to determine which of the eight transmitters is to receive the data from the FIFO 510. This register setting may change either before or after a data transfer into the FIFO 510 has occurred.

The eight possible grant signals in this instance refer to seven (out of a total of eight) output data ports of this PU, plus the input PE 428 of this PU 104 (see FIG. 4). Note that there are eight possible grant signals in this case, because there are only seven output data ports to which the data can be forwarded as the eighth data port simply corresponds to the one associated with the input data port 408. As shown in FIG. 5, there are paths for transferring the received Data, Request, and Initialize signals from the FIFO 510 to all, in this case eight, other devices in the PU 104.

Figure 6:
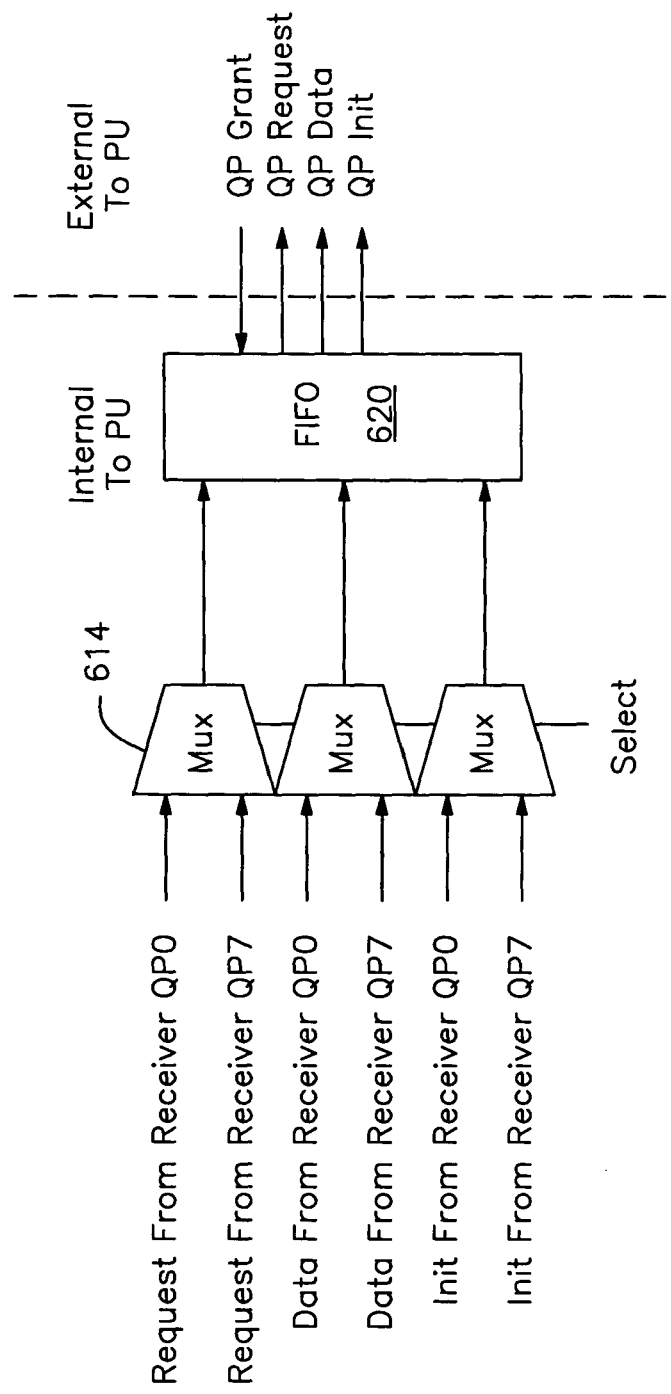
FIG. 6 illustrates part of an output data port used in the processor.

The Initialize (Init) signal is passed through each data port that makes up a data path. Thus, if a data port is initialized at the source point of the data, the Init signal will propagate through the entire logical connection being the data path, and thereby initializes the whole data path. The Init signal is registered and passed through the data port as if it were data, to prevent propagation delays from accumulating through long logical connections in the processor. All of the data port interface signals may be handled in this manner, including the data and request signals, to prevent large combinatorial delays through the logical connections. Other implementations of the input data port 408 that allow a logical connection to be established between the package pins of an input data port and those of an output data port are also possible. FIG. 6 illustrates a block diagram of part of an output data port 436.

The output data port 436 shown in FIG. 6 may also be referred to as a "transmitter" port, because it transmits data to other PUs 104. A set of three multiplexers 614 are provided, to select the Request, Data, and Init signals that will be transmitted out of the PU. Note that each multiplexer 614 has, in this embodiment, eight inputs, which correspond to seven input data ports of the PU, plus one output PE 432 (see FIG. 4). Once again, the select inputs to the multiplexers 614 may be controlled by a register setting that can change before or after a data transfer has occurred.

The selected Request, Data, and Init information are placed in temporary storage in a FIFO 620. As in the case of the input data port 408 described in connection with FIG. 5 above, the FIFO 620 of the output data port provides the buffered Request, Data, and Init information in response to a received Grant from a device external to the PU.

Figure 7:
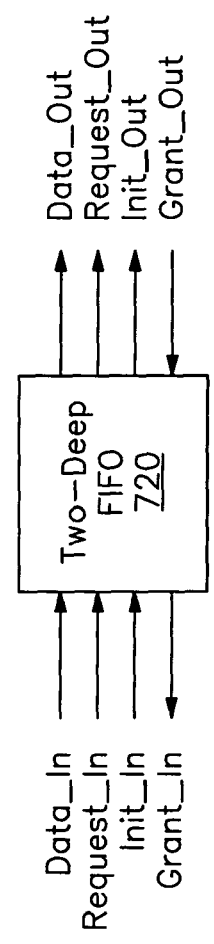
FIG. 7 shows the input and output signals to first-in first-out logic used in the input and output data ports.

The combination of FIFO 510 and FIFO 620 can be illustrated as a 2-deep FIFO 720 as in FIG. 7. This 2-deep FIFO 720 is part of a logical connection, through a given PU, that is made of an input data port and an output data port. On the input side, data_in, request_in, and init_in are received and stored in the FIFO 720, and a grant_in is signaled when this set of input information has been accepted. The FIFO 720 is part of a programmed logical connection that transmits data_out, request_out, and init_out, in response to receiving a grant_out signal from a device external to the PU. As mentioned above, these interface signals are handled in a manner to prevent large combinatorial delays through the logical connection. This facilitates system on chip designs, without special concerns about data path routing. All routing between the data ports may be simple, point-to-point connections that are registered in each data port as described above. The logical connection is programmed by the simple register setting for the multiplexers 514 (FIG. 5) and 614 (FIG. 6). However, other implementations for a logical connection through a PU 104 may be possible.

Turning now to FIG. 8, this figure shows a flow diagram of a generalized data processing method suitable for a flexible, data driven architecture. Operation begins with block 804 in which a first set of instructions and incoming data are provided to a first processing unit (PU) of a data driven processor. As suggested above, these instructions and incoming data (as well as the data path for the incoming data to reach the first PU) may be orchestrated and configured by an on-chip CPU or an external host controller, via a relatively low speed, global control bus of the processor. Additionally, one or more control paths are configured, for the first PU to send memory channel addressing information to a memory access unit of the processor.

As the first PU operates upon the incoming data, it recognizes that this first set of instructions requires either reading from or writing to external memory. Accordingly, operation then continues with block 808 in which the first PU requests the memory access unit (via the control path) to fetch or expect data on a given memory channel. A logical data path between a second PU of the processor and the external memory (via the given memory channel) has been previously created to transfer additional data between the external memory and the second PU. According to an embodiment of the invention, the added control port structure described above is used for allowing the first PU to specify the location of the data to be transferred, through a previously programmed data path between the external memory and the second PU. This logical data path may be routed through a data port mesh arrangement that is independent of the individual programming elements within each processing unit.

As an example, the first PU may recognize an image processing motion vector in the first set of instructions. In that case, the additional data is to be written to the external memory, and includes a macro block that will be generated by the second PU based on the motion vector. Many other types of data driven applications, such as audio compression, may also benefit from this added capability.

Figure 9:
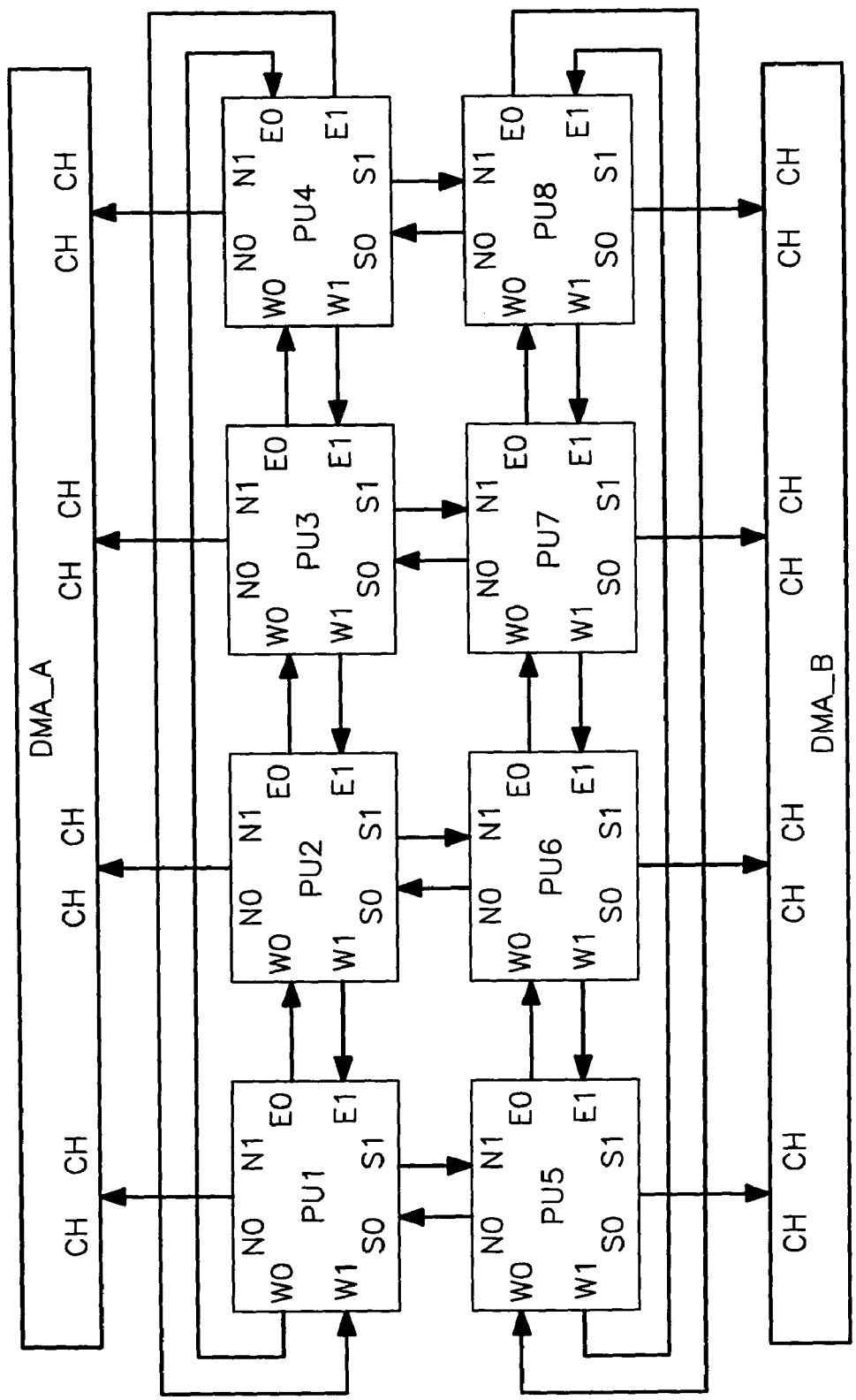
FIG. 9 illustrates a high level block diagram of a control port mesh arrangement for the data driven processor.

FIG. 9 illustrates a high level block diagram of a control port mesh arrangement for the data driven processor. In this figure, only the control port mesh arrangement is illustrated, for an easier understanding. In this embodiment of the invention, the DMA units are slaves to the PUs in that DMA channels cannot initiate commands; rather, all commands to the DMA channels are initiated by either the north or south control ports of the PUs. Each PU in this example contains four control port sets labeled north, east, south, and west. Each has a port 0 and port 1. For example, the EI port of PU1 receives commands while E0 transmits commands (when configured to be a part of a control path in the mesh arrangement). A point-to-point bus connection is supported by a pair of control ports from adjacent PUs (or from a PU and a DMA unit).

Figure 10:
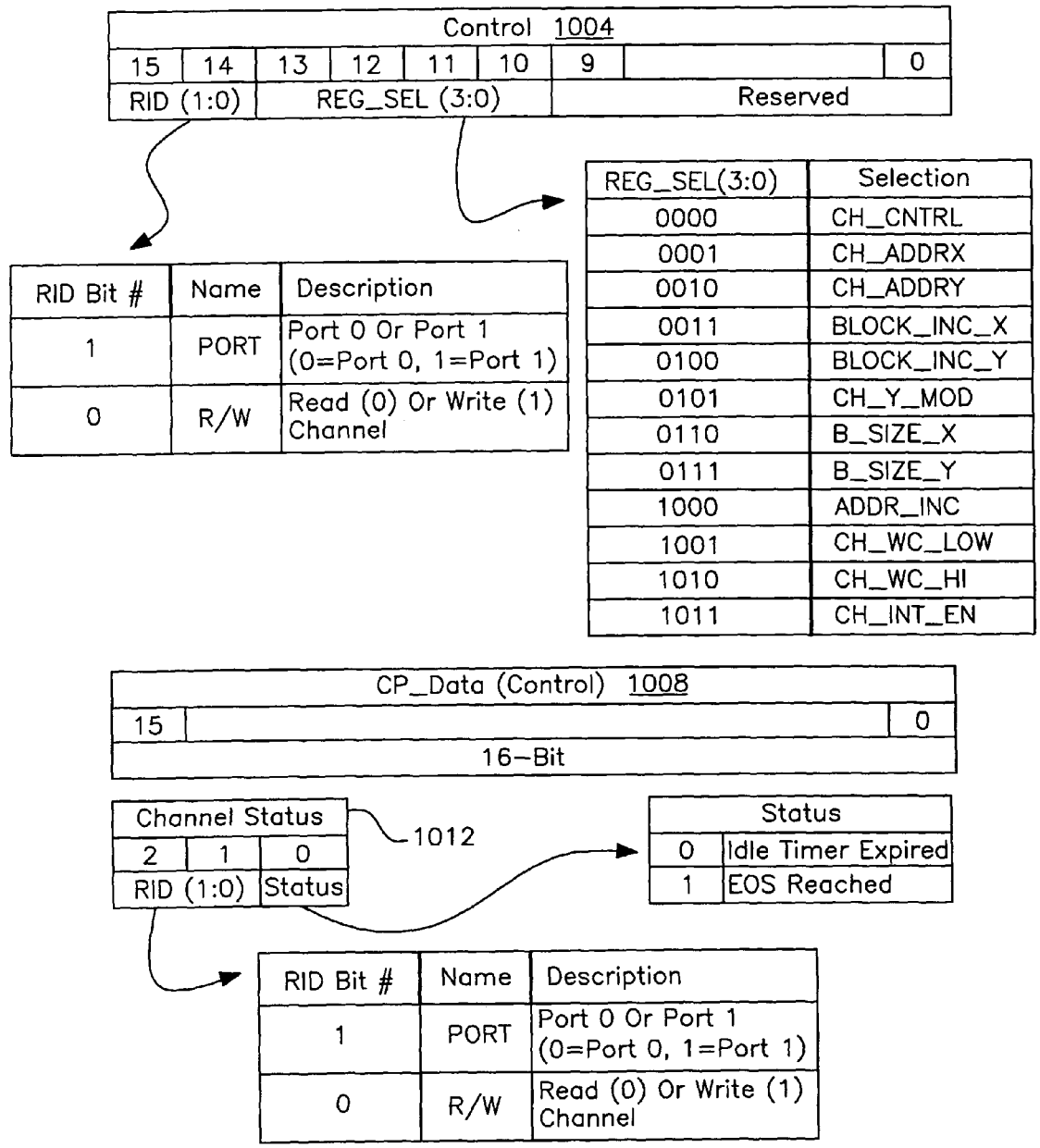
FIG. 10 shows an example of a control word, a control port data word, and status indications that are used by the control ports to communicate with each other.

The point-to-point connection between a transmitter port and a receiver port (external to a PU) may be built using a parallel bus having a command portion and a status portion. The command portion may have a 16-bit bus and is used to transmit configuration instructions destined to the DMA unit, for a particular data channel of the DMA unit. A status bus may be provided with three bits that are used to send the status of the data channel back to the command initiator. A request and grant signaling protocol may be used, in addition to the use of Initialize (Init) signals, similar to the data port links described above. The transmission of a complete command may thus take two clock cycles. Referring now to FIG. 10, in the first cycle, a control word 1004 may be transmitted followed by, in the second cycle, a control port_data word 1008, to complete a command. As can be seen in FIG. 10, the control word includes routing information (router identification, RID) that helps the control ports in routing the commands to their correct destination. More particularly, a receiver port determines the destination of a command based on the RID bits which specify either port 0 or port 1 in this example, as well as whether the command specifies a read or a write channel. Recall that the ultimate destination of this command will be a DMA unit which will set up a data channel (available through a data port, as described above) for servicing the requested read or write command. The port bit (RID#1) may be hard-wired in a transmitter port, depending on whether it is a 0 or a 1 port. The R/W bit is driven by the command initiator and will be passed through unchanged by all the control ports in the control path.

The control word 1004 also includes REG_SEL bits, in this case four, for defining the configuration of the data channel. For example, the control port_data word 1008 that follows a REG_SEL value of 0000 may be used to signal the start of the memory transfer. Another command may refer to the (x,y) data location for the read or write (CH_ADDRX and CH_ADDRY). Various other types of commands have been defined in FIG. 10, where these are particularly suited for still and video image processing applications. Other applications may have a different set of commands although most will include at least some form of data location or addressing information that allows the DMA unit to read or write content data (using a separate data path associated with a given data channel) from and to external memory. Note that this data path may have been previously configured in the data port mesh arrangement, by for example the host controller.

Still referring to FIG. 10, the receiver port may send a status indicator 1012 in response to receiving a control word 1004 and control port_data word 1008. In this example, the status indicator is sent when one of two conditions occur: either an idle timer has expired, or an end of swath (EOS) has been reached. If neither of these two conditions has occurred, the command initiator will not receive any status indication. For example, an idle timer may expire if there is no EOS condition and there is no memory read or memory write activity for a certain number of clock cycles after the last read or write. In the write situation, the idle timer expires if a DMA channel has waited over a certain number of clocks for additional content data to become available at a data port, after the previous read or write by that channel. In a write situation, the idle timer may expire if the data channel has waited over a certain number of clocks for additional content data to be received from a PU over a given data path. In a read situation, the idle timer may expire if the last content data word has moved out of the data channel (on its way to a PU) over a certain number of clock cycles go. Other ways of defining the request and grant protocol for signaling between control ports are possible.

Note that if the command initiator receives an idle timer expired condition, it can program an Init bit in a control port control register (not shown) to a predefined value, thereby clearing all commands that are in the control path as well as in the particular DMA channel associated with the control path. In addition, if an idle timer expired condition has been detected for a write data channel, the command initiator may program the Init bit in a data port control register to a predefined value, thereby clearing all the content data in the data port path as well as allowing the write data channel to be reconfigured by commands in the DMA unit's queue.

Figure 11:
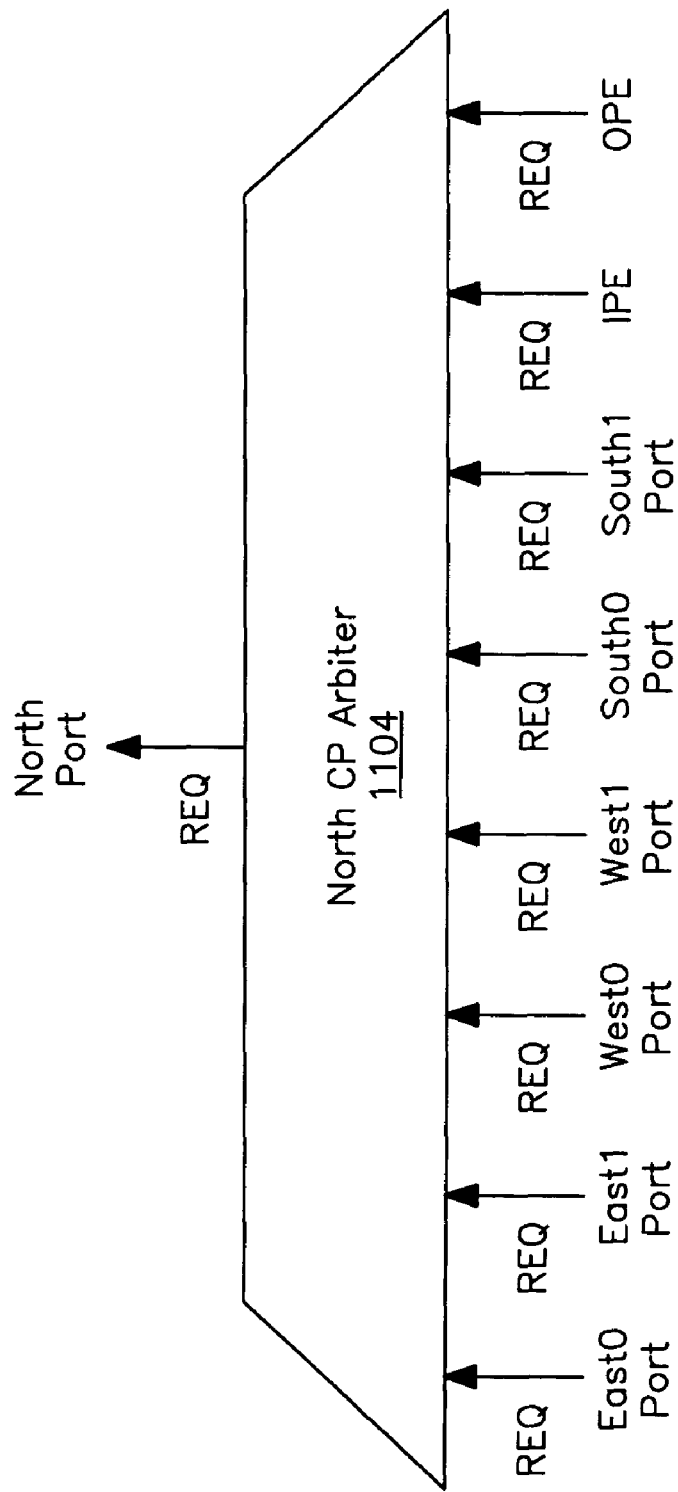
FIG. 11 depicts a simplified block diagram of an arbiter that can be used in a control port transmitter.

Referring now to FIG. 11, what is shown is a simplified diagram of an arbiter that may be used for a control port, in this case one of the north ports N0 and N1 (see FIG. 9). The arbiter 1104 is in the transmitter and thus arbitrates requests from, in this example, eight possible connection paths of the associated PU (because there are six control ports from which a request may be received to transmit, an input programming element (IPE) which can source a read command, and an output programming element (OPE) which can source a write command. In other embodiments, there may be fewer than six or greater than six control ports that can source a request.

Figure 12:
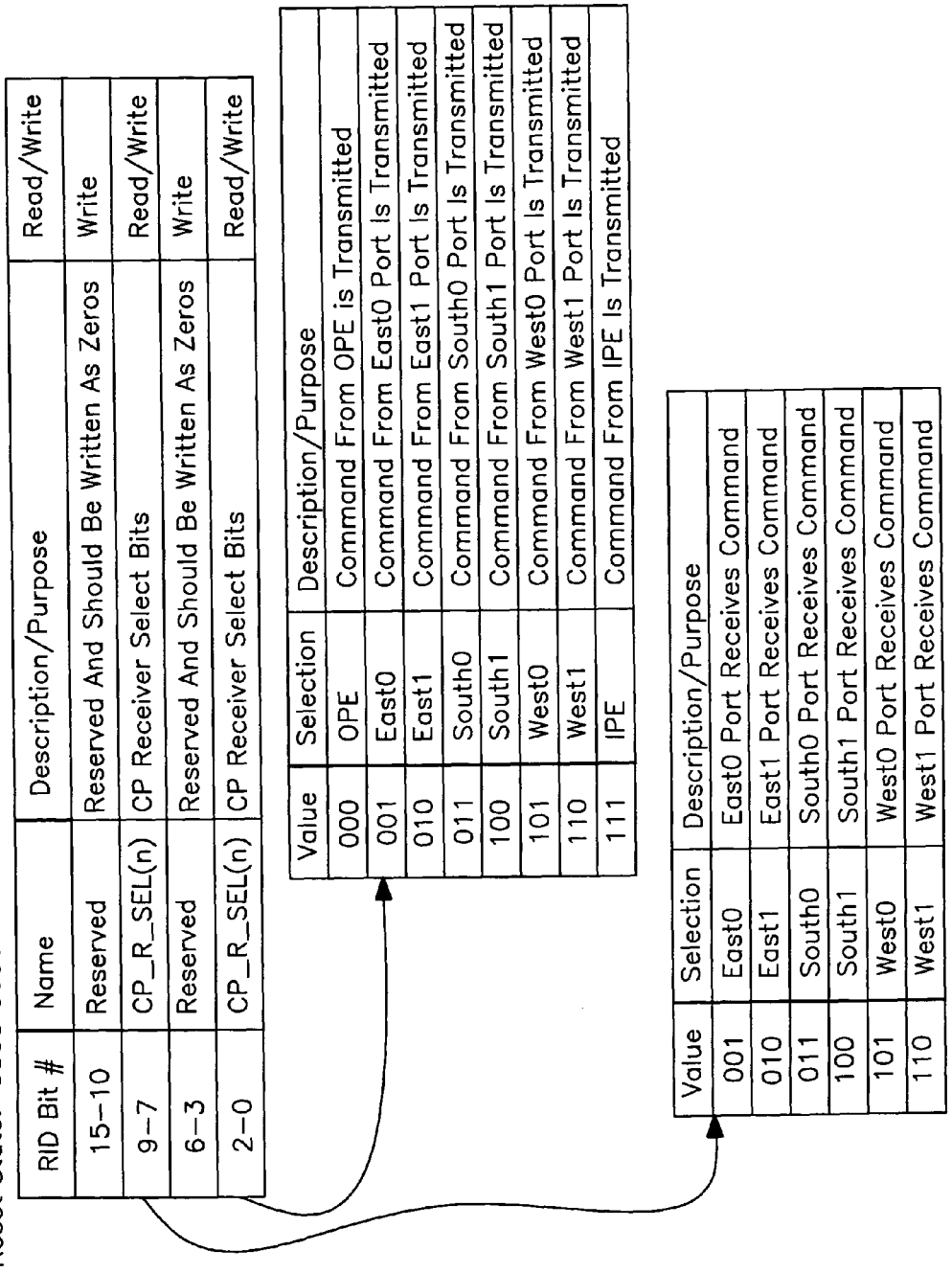
FIG. 12 gives an example of select registers that may be provided for a particular control port, for configuring the transmitter and receiver portions of that control port.

Turning now to FIG. 12, an example select register for control port North0 is illustrated. In this example, there are three bits that are used for the control port receiver selection, and three bits for the transmitter selection. The receiver select bits program the control port by indicating which device of the associated PU should receive commands that have arrived through the north port. Similarly, the transmitter select bits determine which device (from the possible eight mentioned above) will be able to transmit commands through the north port. Note that a command from OPE is generally directed to a DMA write channel, whereas a command from IPE is directed to a DMA read channel. Other ways for programming a control port to act as a transmitter (send commands out of the PU) and as a receiver (route commands into a device of the PU) may be possible.

To summarize, various embodiments of a data driven processor that may be more effective for running a wider range of applications have been described. In the foregoing specification, the invention has been described with reference to specific exemplary embodiments thereof. It will, however, be evident that various modifications and changes may be made thereto without departing from the broader spirit and scope of the invention as set forth in the appended claims. For example, although the processors depicted in the figures have either six or eight constituent PUs, an architecture with as few as two PUs or more than eight PUs, connected to each other in a mesh arrangement, can also benefit from the addition of control ports to some or all of the PUs. The specification and drawings are, accordingly, to be regarded in an illustrative rather than a restrictive sense.

What is claimed is:

1. A data driven processing method, comprising:
providing, by an external host controller, a first set of instructions to a first processing unit, of a data driven processor having a plurality of processing units, the first processing unit to operate upon incoming data in accordance with the first set of instructions;
configuring, by the external host controller, a data path through a mesh arrangement of data ports for transferring data between a second processing unit of the data driven processor and external memory, wherein the data path couples the second processing unit to the external memory through a memory access unit of the data driven processor, wherein the coupling of each pair of data ports of adjacent processing units is a point-to-point connection, and wherein the mesh arrangement of data ports allows data flow (a) from any one of the processing units directly to another without accessing memory and (b) from any one of the processing units to the memory access unit; and
the first processing unit, in response to recognizing that the first set of instructions will require one of reading from and writing to external memory based on having processed the first set of instructions, provides addressing information to the memory access unit of the processor through a control port of the first processing unit to enable the transfer of additional data between the external memory and the second processing unit via said data path.

2. The method of claim 1 wherein the first processing unit recognizes an image processing motion vector in said first set of instructions, and said additional data is to be written to the external memory and includes a macro block generated by the second processing unit based on the motion vector.

3. The method of claim 1 wherein the first and second processing units each have a plurality of control ports including an input control port and an output control port, and wherein the input control port of a processing, unit is programmable to route incoming command information to anyone of the output control ports of the processing unit.

4. The method of claim 1 further comprising:
the first processing unit providing an indication to the memory access unit of whether the transfer is one of a read and a write.

5. A data processor comprising:
a first direct memory access (DMA) unit;
a plurality of processing units each having a plurality of data ports, the data ports of adjacent processing units being coupled to each other in a mesh arrangement by point-to-point connections and programmable to allow data flow (a) from any one of the processing units directly to another without accessing memory and (b) from any one of the processing units to the DMA unit,
wherein one of the processing units has a control port from which it is to send information to the DMA unit about setting up a DMA channel through which one of data to be consumed and result data by one of the processing units is transferred; and
a host interface unit to receive instructions, from an external host controller, that configure the data flow between the data ports of adjacent processing units and between the data ports and the DMA unit to create a data path from one of the processing units to external memory.

6. The processor of claim 5 further comprising:
memory interface circuitry, wherein the DMA unit is to access external memory via the memory interface circuitry.

7. The processor of claim 6 wherein the memory interface circuitry is on-chip with the DMA unit, the plurality of processing units, and the host interface.

8. The processor of claim 6 wherein the memory interface circuit is designed to interface with external memory that is dynamic random access memory.

9. The processor of claim 5 wherein each of the processing units has an input programming element (PE) to read incoming data from any one of its input ports, an output PE to write result data to any one of its output ports, and a core PE to execute instructions independently of a data path that is operating through a pair of the input and output ports of that processing unit.

10. The processor of claim 6 wherein each of the plurality of processing units has a plurality of control ports on each side including an input control port and an output control port, and wherein the input control port of a processing unit is programmable to route incoming command information to any one of the output control ports of said processing unit.

11. The processor of claim 9 further comprising an interface to an external device, and wherein the output ports of one of said processing units are coupled to the input ports of an adjacent one of said processing units except that some of the output ports of an outlying one of said processing units are coupled to the external device interface.

12. The processor of claim 5 further comprising:
a second DMA unit, wherein there are at least four of said plurality of processing units, the data ports on a north side of first and second ones of said four processing units are coupled to the first DMA unit, the data ports on a south side of third and fourth ones of said four processing units are coupled to the second DMA unit, and the data ports of the south side of the first and second processing units are coupled to the data ports of a north side of the third and fourth processing units.

13. The processor of claim 12 further comprising an interface to an external device, wherein some of the data ports of east and west sides of the processing units are coupled to the external device interface.

14. The processor of claim 5 further comprising a central processing unit to read and execute instructions that configure the data flow between the data ports of adjacent processing units and between the data ports and the DMA unit to create a data channel from one of the processing units to external memory.

15. The processor of claim 5 wherein the plurality of processing units are essentially identical units each having a plurality of sides, each side having a plurality of unidirectional data ports being an input port and an output port wherein the input port is programmable to route incoming data to any one of the output ports.

16. A system comprising:
an external host controller;
external memory;
a data driven processor having a memory access unit to interface the external memory, a plurality of processing units each having a plurality of data ports, the data ports of adjacent processing units being coupled to each other in a mesh arrangement by point-to-point connections and programmable to allow data flow (a) from any one of the processing units directly to another without accessing memory and (b) from any one of the processing units to the memory access unit, and a host interface unit to receive instructions from the external host controller that configure the data flow between the data ports of adjacent processing units and between the data ports and the memory access unit to create a data path from one of the processing units through the mesh arrangement of data ports to the external memory, wherein one of the processing units has a control port which it uses to write data location information to the memory access unit; and
one of a rechargeable battery and a fuel cell coupled to power the external memory, the external host controller, and the data driven processor.

17. The system of claim 16 wherein the external host controller includes an embedded processor and its associated main memory.

18. The system of claim 16 wherein each of the processing units has a core programming element (PE) that can be programmed to execute instructions that operate on incoming data received via an input data port of that processing unit, an input PE that can read data from any one of a plurality of input data ports of that processing unit, and an output PE that can write data to any one of a plurality of output data ports of that processing unit.

19. The system of claim 18 wherein the core PE of each processing unit can execute its instructions independently of a data path that is operating through a pair of said input and output data ports of that processing unit.

20. The system of claim 16 wherein the data location information that is sent through the control port includes information about the size and display location of a block of image data.

* * * * *